US011891988B2

(12) United States Patent
Mullins et al.

(10) Patent No.: US 11,891,988 B2
(45) Date of Patent: Feb. 6, 2024

(54) HYDRAULIC FLUID PUMP AND RETAINER ASSEMBLY FOR SAME

(71) Applicant: GARDNER DENVER PETROLEUM PUMPS, LLC, Tulsa, OK (US)

(72) Inventors: Chance Ray Mullins, Tulsa, OK (US); Konner Casey Kay, Tulsa, OK (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 78 days.

(21) Appl. No.: 17/468,827

(22) Filed: Sep. 8, 2021

(65) Prior Publication Data

US 2021/0404453 A1 Dec. 30, 2021

Related U.S. Application Data

(62) Division of application No. 16/298,228, filed on Mar. 11, 2019, now Pat. No. 11,131,295.

(51) Int. Cl.
*B23P 15/00* (2006.01)
*F04B 1/0448* (2020.01)
(Continued)

(52) U.S. Cl.
CPC .......... *F04B 1/0448* (2013.01); *B23P 15/001* (2013.01); *F04B 1/0452* (2013.01); *F04B 1/0456* (2013.01); *F04B 1/0465* (2013.01); *F04B 23/06* (2013.01); *F04B 39/122* (2013.01); *F04B 39/125* (2013.01); *F04B 39/14* (2013.01);
(Continued)

(58) Field of Classification Search
CPC .... F04B 1/0448; F04B 1/0452; F04B 1/0456; F04B 1/0465; F04B 23/06; F04B 39/122; F04B 39/125; F04B 39/14; F04B 53/007; F04B 53/1025; F04B 53/16; F04B 53/22;
(Continued)

(56) References Cited

U.S. PATENT DOCUMENTS 2,899,247 A 8/1959 Clarkson et al.
3,185,103 A 5/1965 Yohpe
(Continued)

FOREIGN PATENT DOCUMENTS

WO 2017096488 A1 6/2017
WO 2021195572 A1 9/2021

OTHER PUBLICATIONS

Gardner Denver, Single Acting Triplex Pump, Model PZ-1600, 11 Stroke Parts List (PZL Manual), Nov. 2020, 54 pages.
(Continued)

*Primary Examiner* — Ryan J. Walters
(74) *Attorney, Agent, or Firm* — Edell, Shapiro & Finnan, LLC

(57) ABSTRACT

A fluid end assembly of a hydraulic fluid pump includes a housing having a first housing bore and a second housing bore offset axially from the first housing bore. A plate is fastened to the housing. The plate has a first plate bore axially aligned with the first housing bore and a second plate bore axially aligned with the second housing bore. A first removable valve cover closes the first housing bore and a second removable valve cover closes the second housing bore. A first retainer engages the first plate bore and abuts the first removable valve cover and a second retainer engages the second plate bore and abuts the second removable valve cover.

20 Claims, 8 Drawing Sheets

(51) Int. Cl.
  *F04B 1/0452* (2020.01)
  *F04B 23/06* (2006.01)
  *F04B 39/12* (2006.01)
  *F04B 53/22* (2006.01)
  *F04B 39/14* (2006.01)
  *F04B 53/00* (2006.01)
  *F04B 53/16* (2006.01)
  *F04B 53/10* (2006.01)
  *F04B 1/0456* (2020.01)
  *F04B 1/0465* (2020.01)
  *F04B 1/0538* (2020.01)

(52) U.S. Cl.
  CPC ........ *F04B 53/007* (2013.01); *F04B 53/1025* (2013.01); *F04B 53/16* (2013.01); *F04B 53/22* (2013.01); *F04B 1/0538* (2013.01); *F04B 53/1032* (2013.01); *Y10T 29/49236* (2015.01)

(58) Field of Classification Search
  CPC .. F04B 1/0538; F04B 53/1032; B23P 15/001; Y10T 29/49236
  See application file for complete search history.

(56) References Cited

U.S. PATENT DOCUMENTS

| | | | |
|---|---|---|---|
| 3,363,647 A | 1/1968 | Cornelsen et al. | |
| 3,373,695 A | 3/1968 | Yohpe | |
| 3,427,988 A | 2/1969 | Redman et al. | |
| 4,277,229 A | 7/1981 | Pacht | |
| 4,477,236 A | 10/1984 | Elliott | |
| 4,758,135 A | 7/1988 | Woodward et al. | |
| 4,768,933 A | 9/1988 | Stachowiak | |
| 4,773,833 A | 9/1988 | Wilkinson et al. | |
| 4,861,241 A | 8/1989 | Gamboa et al. | |
| 4,878,815 A | 11/1989 | Stachowiak | |
| 5,362,215 A | 11/1994 | King | |
| 7,290,560 B2 | 11/2007 | Orr et al. | |
| 7,506,574 B2 | 3/2009 | Jensen et al. | |
| 7,770,509 B2 | 8/2010 | Kennedy et al. | |
| 7,775,559 B2 | 8/2010 | Steinbock et al. | |
| 7,984,671 B2 | 7/2011 | Jensen et al. | |
| 8,074,679 B2 | 12/2011 | Jensen et al. | |
| 8,365,754 B2 | 2/2013 | Riley et al. | |
| 8,393,260 B2 | 3/2013 | Kennedy et al. | |
| 8,528,462 B2 | 9/2013 | Pacht | |
| 8,701,546 B2 | 4/2014 | Pacht | |
| 8,763,496 B2 | 7/2014 | Case et al. | |
| 9,909,580 B2 | 3/2018 | Jahnke | |
| 10,941,765 B2 | 3/2021 | Nowell et al. | |
| 10,962,001 B2 | 3/2021 | Nowell et al. | |
| 11,131,295 B2* | 9/2021 | Mullins | F04B 1/0465 |
| 11,359,739 B2* | 6/2022 | Dyer | F04B 53/10 |
| 11,408,419 B2 | 8/2022 | Foster et al. | |
| 11,434,901 B2 | 9/2022 | Nowell et al. | |
| 11,486,502 B2 | 11/2022 | Nowell et al. | |
| 11,536,378 B2 | 12/2022 | Nowell et al. | |
| 11,649,901 B2 | 5/2023 | Nowell et al. | |
| 11,655,812 B2 | 5/2023 | Foster et al. | |
| 2009/0123303 A1 | 5/2009 | Ohnishi | |
| 2010/0278661 A1 | 11/2010 | Clemens | |
| 2014/0348677 A1 | 11/2014 | Moeller et al. | |
| 2016/0169385 A1 | 6/2016 | Patterson et al. | |
| 2016/0369909 A1 | 12/2016 | Deel | |
| 2017/0107983 A1 | 4/2017 | Patterson et al. | |
| 2017/0204852 A1 | 7/2017 | Barnett, Jr. | |
| 2018/0363642 A1 | 12/2018 | Salih et al. | |
| 2019/0017503 A1 | 1/2019 | Foster et al. | |
| 2019/0032685 A1 | 1/2019 | Foster et al. | |
| 2019/0178243 A1 | 6/2019 | Nowell et al. | |
| 2021/0095650 A1 | 4/2021 | Nowell et al. | |
| 2022/0412346 A1 | 12/2022 | Nowell et al. | |
| 2023/0116452 A1 | 4/2023 | Nowell et al. | |

OTHER PUBLICATIONS

GD Energy Products, T300M Waterjetting Spec Sheet, 2 pages, available at https://waterjetting.com/bare-shaft-pumps/100-hp-t-300-pumps, accessed Nov. 2022.

Baker Hughes, Pacemaker II and V Pump Parts List, Sep. 29, 2015, 40 pages.

Gardener Denver, Triplex Piston Pump, 5 Stroke, Model Tee Parts List, 3-1-529, 8th Edition, Apr. 2021, 57 pages.

* cited by examiner

HYDRAULIC FLUID PUMP AND RETAINER ASSEMBLY FOR SAME

CROSS REFERENCE TO RELATED APPLICATIONS

This application is a divisional of U.S. nonprovisional application Ser. No. 16/298,228, filed on Mar. 11, 2019 and entitled "HYDRAULIC FLUID PUMP AND RETAINER ASSEMBLY FOR SAME." The disclosure of the above application is incorporated herein by reference in its entirety.

FIELD OF THE INVENTION

The present invention relates to a hydraulic fluid pump and, more particularly, to a fluid end assembly of a hydraulic fluid pump.

SUMMARY

In one embodiment, the invention provides a fluid end assembly of a hydraulic fluid pump. The fluid end assembly includes a housing having a first housing bore and a second housing bore offset axially from the first housing bore. A plate is fastened to the housing. The plate has a first plate bore axially aligned with the first housing bore and a second plate bore axially aligned with the second housing bore. A first removable valve cover closes the first housing bore and a second removable valve cover closes the second housing bore. A first retainer engages the first plate bore and abuts the first removable valve cover and a second retainer engages the second plate bore and abuts the second removable valve cover.

In another embodiment, the invention provides a method of assembling a first valve cover and a second valve cover within a fluid end assembly of a hydraulic fluid pump. The first removable valve cover is inserted into a first housing bore of a housing of the fluid end assembly. The second removable valve cover is inserted into a second housing bore of the housing of the fluid end assembly. A first plate bore of a plate is axially aligned with the first housing bore. A second plate bore of the plate is axially aligned with the second housing bore. The plate is fastened to the housing of the fluid end assembly. A first retainer is positioned into the first plate bore and into abutment with the first removable valve cover. A second retainer is positioned into the second plate bore and into abutment with the second removable valve cover.

In yet another embodiment, the invention provides a hydraulic fluid pump. The hydraulic fluid pump includes a housing of a fluid end of the hydraulic fluid pump, the housing including a first axial end and a second axial end opposite the first axial end, the housing having a housing bore located at the first axial end. A plate is fastened to the housing; the plate having a plate bore axially aligned with the housing bore. A removable valve cover closes the first housing bore. A retainer engages the plate bore and abuts the first removable valve cover. Each fastener of a plurality of fasteners extends through the plate, the first axial end of the housing, and the second axial end of the housing to fasten the plate to the housing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
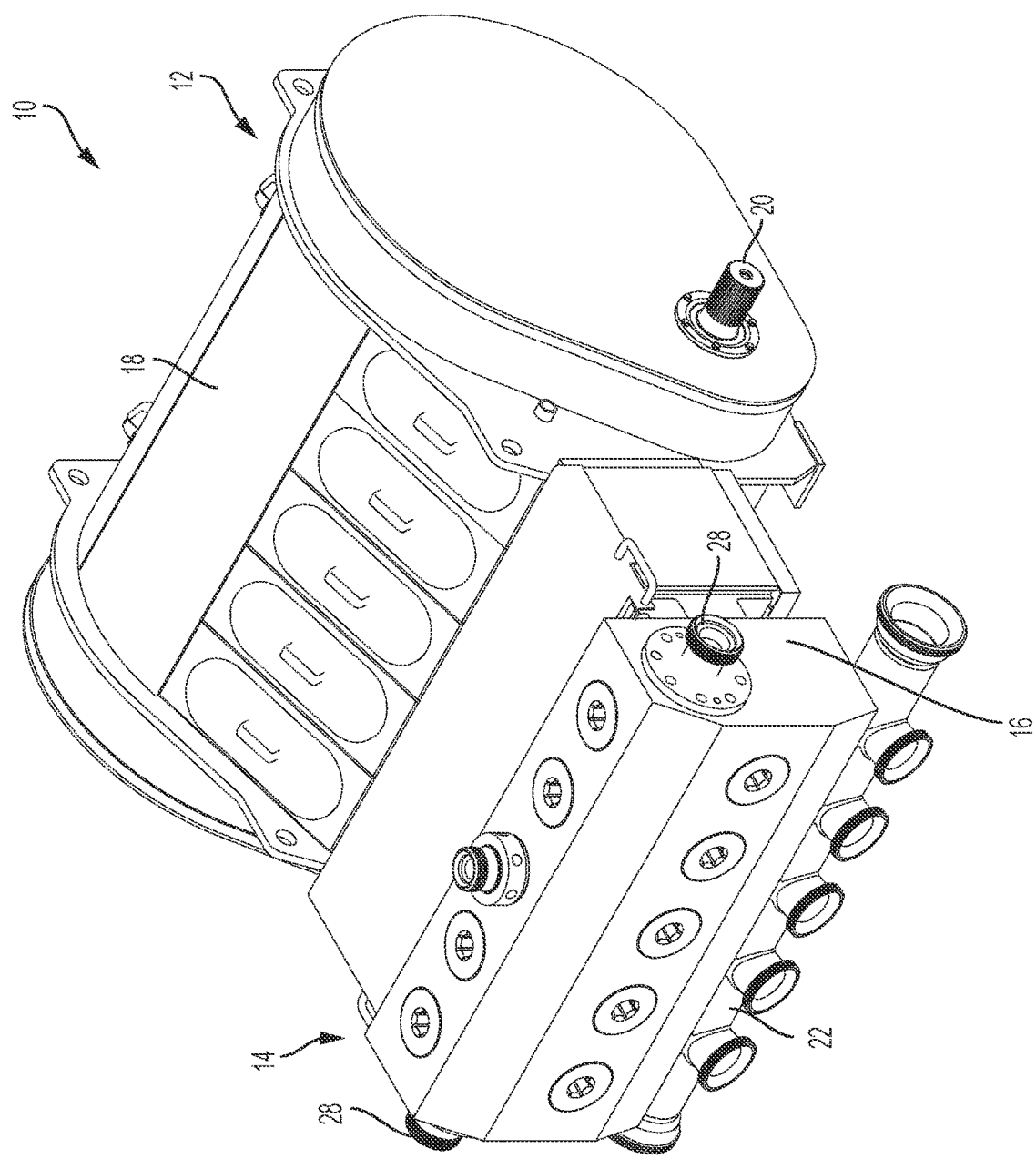
FIG. 1 is a perspective view of a hydraulic fluid pump

FIG. 1 illustrates a hydraulic fluid pump 10 of the type often used during drilling and hydraulic fracturing operations such as hydrocarbon or oil fracturing. The hydraulic fluid pump 10 includes a power end or drive end or drive end assembly 12 that is largely enclosed within a casing 18. A fluid end or fluid end assembly 14 attaches to the drive end 12 and the casing 18 and includes at least one fluid end block 16. A drive shaft 20 extends out of the casing 18 and provides for a connection point for a prime mover such as a motor or engine. The prime mover drives the drive shaft 20 at a desired speed to power the drive end 12. The drive end 12 typically includes a transmission (e.g., gears, belts, chains, etc.) that serve to step down the speed of the drive shaft 20 to a speed appropriate for the fluid end 14. The drive end 12 includes a series of reciprocating mechanisms that in turn drives a piston or plunger (e.g., plunger 46 shown in FIG. 2) within a respective bore of the fluid end block 16 to pump a fluid.

Figure 2:
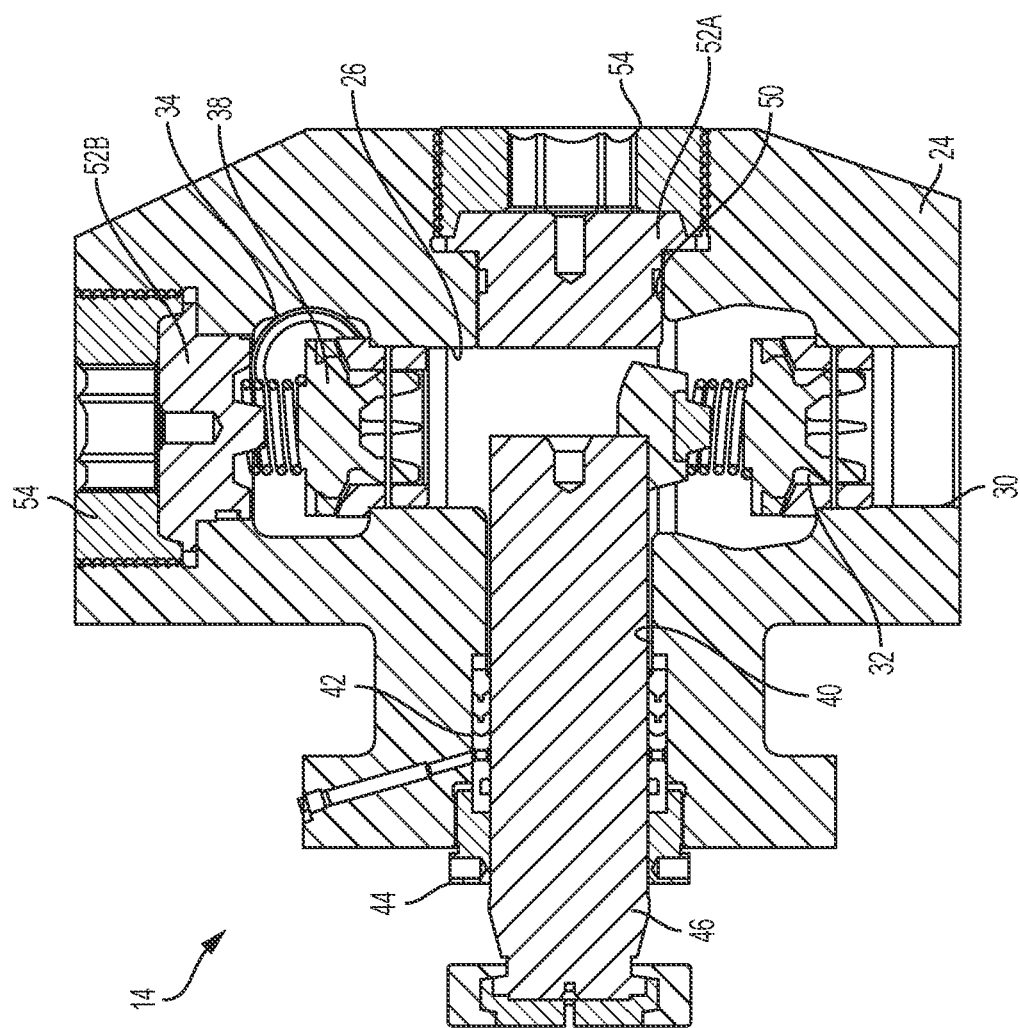
FIG. 2 is a cross-sectional view of a fluid end assembly of a hydraulic fluid pump.

The fluid end 14 is better illustrated in FIG. 2. A housing 24 defines the main body of the fluid end assembly 14 surrounding an interior volume 26. An inlet manifold 22 (FIG. 1) distributes fluid to an inlet bore 30 of each fluid end block 16. An inlet valve 32 is positioned in the inlet bore 30 to control flow from the inlet manifold 22 into the interior volume 26 of the fluid end 14, and more specifically, the interior volume 26 of the housing 24. An outlet bore 34 directs pressurized fluid from the interior volume 26, past an outlet valve 38, and to an outlet manifold integrated into the fluid end 14 and having an outlet 28 (FIG. 1) from the fluid end 14. The outlet manifold 28 is in fluid communication with the fluid end block 16 via the outlet bore 34 and outlet valve 38. As shown, the inlet and outlet bores 30, 34 are axially aligned with one another.

A plunger bore 40 extends perpendicular to the inlet and outlet bores 30, 34 and supports a packing arrangement 42 and packing retainer 44. The reciprocating plunger 46 is movable within the plunger bore 40 relative to the packing arrangement 42 and the packing retainer 44 to pressurize fluid within the interior volume 26 and to the outlet manifold 28. A service bore 50 is formed in the housing 24 parallel with and axially aligned with the plunger bore 40 and provides access to the interior volume 26 of the housing 24 without removal of the plunger 46, or the valves 32, 38. The service bore 50 may additionally provide access for insertion and removal of the plunger 46 and/or the inlet valve 32 from the remainder of the pump 10.

As shown, both the outlet bore 34 and the service bore 50 include valve covers 52A, 52B and retainers 54. The valve covers 52A, 52B seal against the housing 24 to prevent fluid from the interior volume 26 from passing through the respective bores 34, 50. Each retainer 54 applies a force to the respective valve cover 52A, 52B to hold the valve cover 52A, 52B in a sealing position against the housing 24. When the reciprocating plunger 46 increases the pressure of the fluid within the interior volume 26 of the housing 24, a force is applied on the valve covers 52A, 52B (either directly, as with the valve cover 52A of the service bore 50, or indirectly, as with the valve cover 52B of the outlet bore 34). The retainer 54 applies a preload to the valve cover 52A, 52B to counteract the force applied by the pressurized fluid and to prevent unseating of the valve cover 52A, 52B from the housing 24.

Figure 3:
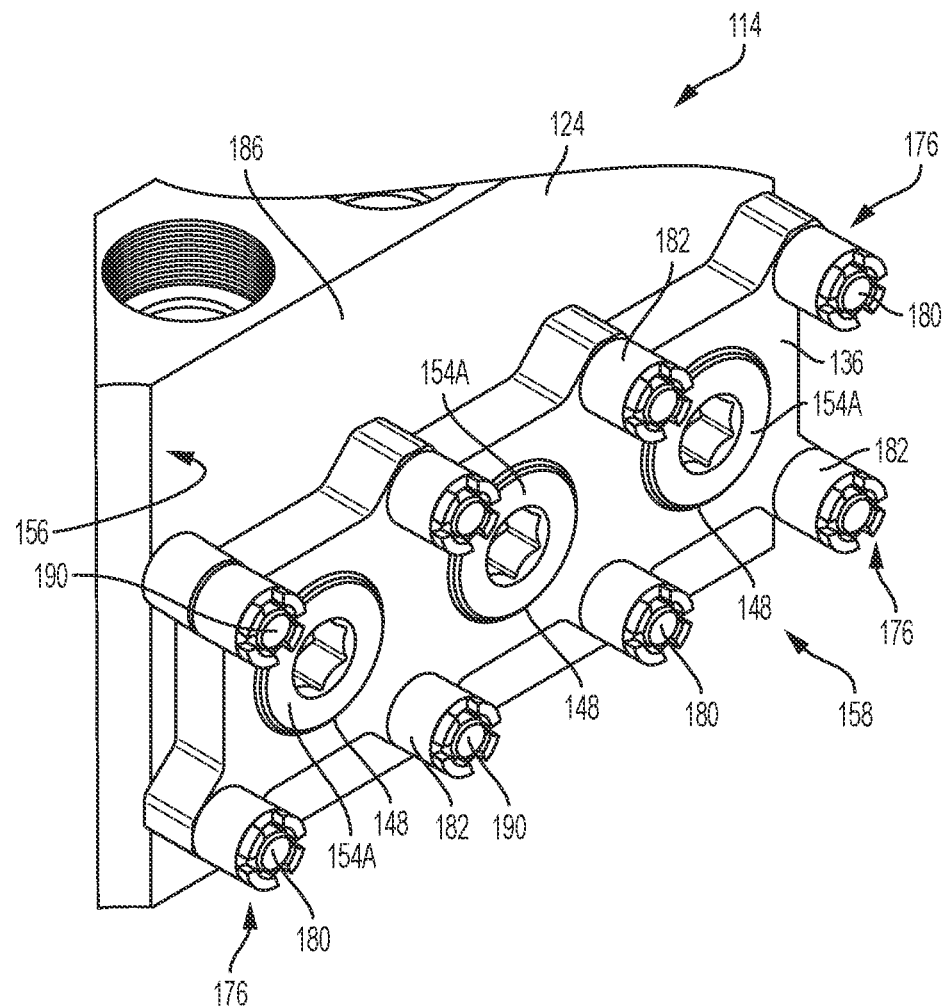
FIG. 3 is a perspective view of a retainer assembly of a hydraulic fluid pump.
Figure 4:
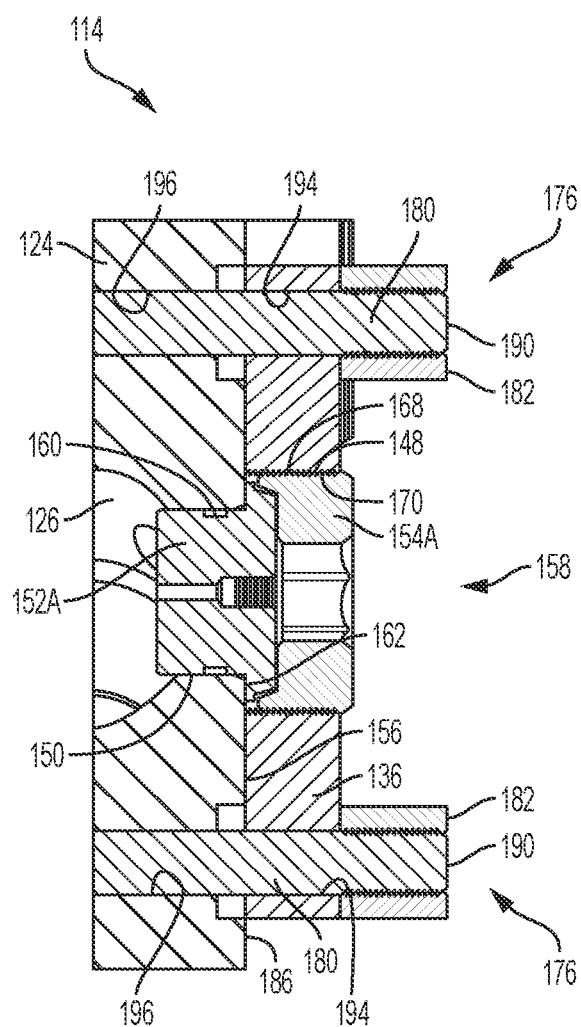
FIG. 4 is a sectional view of the retainer assembly of FIG. 3, shown through a retainer and a plurality of fasteners.
Figure 5:
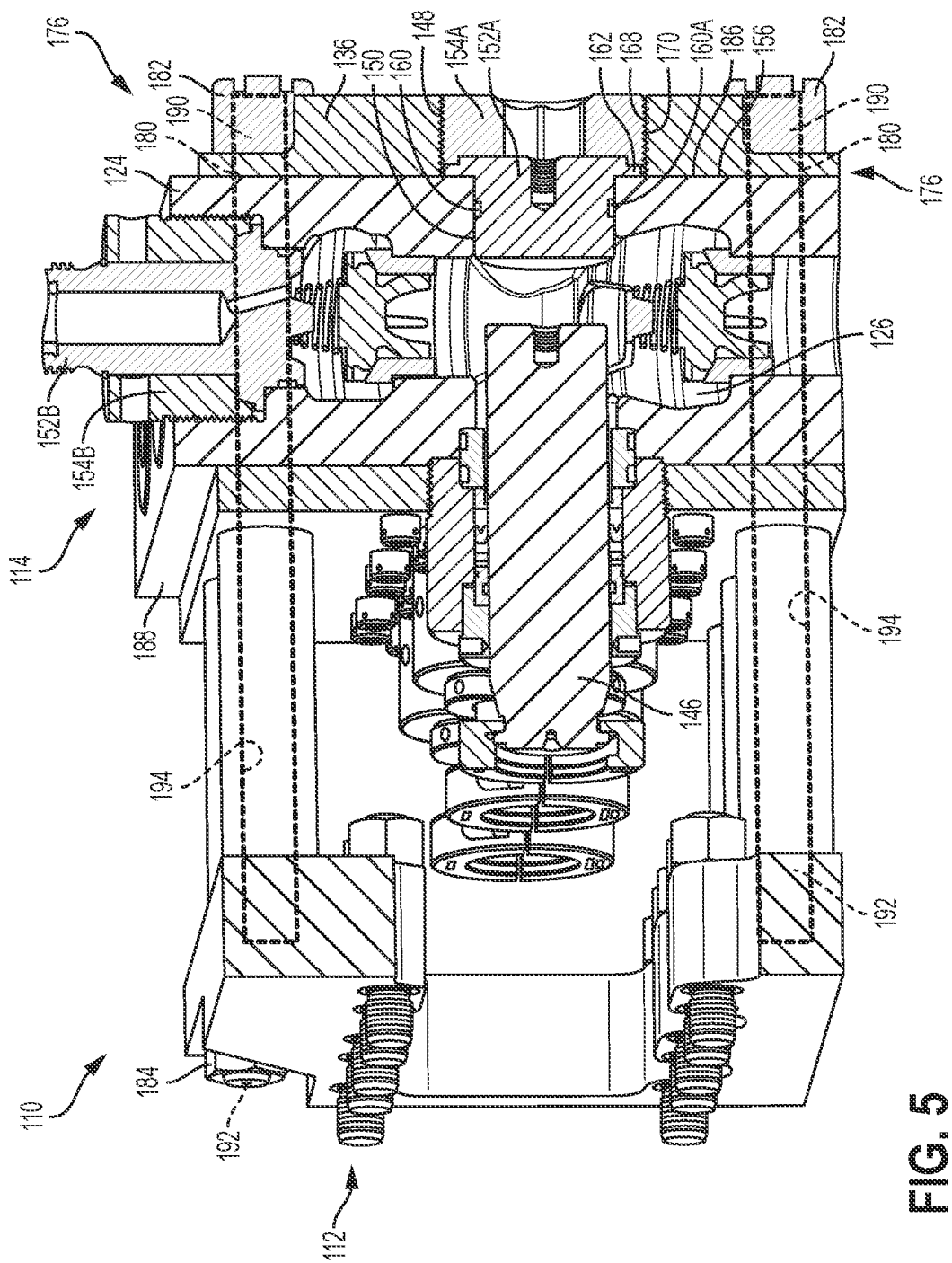
FIG. 5 is a cross-sectional perspective view of the retainer assembly of FIG. 3.

FIGS. 3-5 illustrate an embodiment of the invention. Like elements are indicated by like reference numerals incremented by 100 (relative to the components shown in FIGS. 1-2) and are similar to those elements except as otherwise described.

The retainer assemblies 158, 258 shown in FIGS. 3-7 are illustrated with respect to the retainer 154A valve cover 152A. However, the retainer assemblies 158, 258 can be equally applied to the retainer 154B and the valve cover 152B.

As shown in FIGS. 4-5, the valve cover 152A is inserted into the service bore 150 and includes a radial seal 160 positioned within a channel 160A in the valve cover 152A to provide a seal between the valve cover 152A and the housing 124. The valve cover 152A can additionally or alternatively be provided with an axial seal to engage the housing 124. The valve cover 152A is generally cylindrical with a diameter similar to the diameter of the housing bore 150. The valve cover 152A further includes a circumferential lip 162 for engaging a surface 156 of the housing 124. As shown, the surface 156 is a first axial end 186 of the housing 124. A second axial end 188 of the housing 124 is opposite the first axial end 186. The ends 186, 188 of the housing 124 are considered "axial" based on the orientation of the housing bore 150. The valve cover 152A is not threaded or otherwise fastened to the housing bore 150, outside of a clearance fit and/or friction provided by the radial seal 160.

In contrast to the fluid end 14 shown in FIGS. 1-2, the fluid end 114 shown in FIGS. 3-5 includes a plate 136 abutting the first axial end 186 of the housing 124 for supporting the retainers 154A. The plate 136 is a flat sheet of metal (e.g., steel, stainless steel, etc.) having a thickness to support the retainer 154A. The plate 136 is formed separate from the housing 124 and attached to the housing 124 via fasteners 176. Forming the plate separate from the housing 124 decreases the overall size of the housing 124 and the overall size of the raw material necessary to make the housing 124 in at least a width dimension. Alternatively or additionally, a plate may be fastened to the housing 124 for supporting the retainers 154B, thereby limiting the overall size of the raw material necessary to make the housing 124 in the height dimension as well.

With continued reference to FIGS. 3-5, the plate 136 includes a plurality of plate bores 148, each plate bore 148 associated with and aligned with a housing bore 150 in the housing 124. As shown in FIG. 3, the housing 124 includes three housing bores 150. Each housing bore 150 is an access bore for accessing an internal volume 126 associated with a different reciprocating plunger 146 and each housing bore 150 supports a different valve cover 152A. Each plate bore 148 is threaded (i.e., has internal threads 168) for engaging the external threads 170 of the retainer 154A.

As shown, the plate 136 is fastened to the housing 124 via fasteners 176, and specifically via tie rods (or pad studs or stay rods) 180 and nuts 182, 184. Each tie rod 180 is an elongated cylindrical shaft that has a length to extend through the first and second axial ends 186, 188 of the housing 124. Each axial end 190, 192 of the tie rods 180 is threaded (i.e., includes threads). As shown in FIGS. 3-5, the first axial end 190 of the tie rods 180 is fastened to a nut 182 located adjacent the plate 136 such that the plate 136 is sandwiched between the nut 182 and the surface 156 of the housing 124. In some embodiments, a seal (not shown) may be sandwiched between the plate 136 and the housing 124. As shown in FIG. 5, the second axial end 192 of the tie rods 180 may be fastened to a nut 184 similar to the first axial end 190, or, as shown, may otherwise terminate within a threaded aperture to prevent axial translation of the tie rod 180 relative to the housing 124. Each tie rod 180 extends through an aperture 194 (e.g., unthreaded aperture) in the plate 136 and into and through an aperture 196 (e.g., an unthreaded aperture) in the housing 124.

With continued reference to FIG. 5, the tie rods 180 extend to and through or into a portion of the drive end 112, or a component that is fastened to the drive end 112 such that the tie rods 180 (along with one or more nuts 182, 184) fasten the drive end 112 to the fluid end 114.

Since the plate 136 is a single plate having a plurality of plate bores 148, the plate bores 148 are accurately spaced relative to one another and can be quickly aligned with the housing bores 150 by aligning a first one of the plate bores 148 relative to a first housing bore 150. Further, utilizing a single plate helps to provide a more consistent preload across all valve covers 152A.

In operation, to assemble a plurality of valve covers 152A within a fluid end assembly 114 of a hydraulic fluid pump 110, the fluid end 114 is installed on the tie rods 180 by inserting the tie rods 180 through the unthreaded apertures 196. In some embodiments, the tie rods 180 may be first installed relative to the drive end (similar to drive end 12) or to another component such that the tie rods 180 are positioned relative to one another and the fluid end 114 is installed onto the tie rods 180. In other embodiments, the tie rods 180 may be individually inserted into and through the apertures 196 and fastened at the second end 192. With the fluid end 114 and tie rods 180 assembled, the plate 136 is installed on the pad studs by axially aligning the apertures 194 in the plate 136 with the tie rods 180. Once two of the apertures 194 are aligned with two of the tie rods 180, the remainder of the apertures 194 will be aligned with the remainder of the tie rods 180 and each plate bore 148 will be axially aligned with the respective housing bore 150. Once aligned, the plate 136 is axially translated along the length of the tie rods 180 and into abutment with the surface 156 of the housing 124. In this way, the tie rods 180 function as guides for axially aligning and translating the plate 136 relative to the housing 124. The plate 136 is then fastened to the housing 124 of the fluid end assembly 112. Fastening the plate 136 to the housing 124 includes securing the tie rods 180 at the first end 190 via a nut 182 and applying a predefined torque to the nut 182. The plate 136 is thereby sandwiched between the nuts 182 and the housing 124 to prevent movement of the plate 136 relative to the housing 124. The removable valve covers 152A are inserted through respective plate bores 148 and into respective housing bores 150, where the radial seal 160 provides a seal between the valve cover 152A and the housing 124. The retainers 154A are threaded into respective plate bores 148 and are tightened (by threading the retainers 154A within the respective threaded plate bores 148) against the removable valve covers 152A. The retainers 154A may be inserted into the plate 136 after the plate 136 is fastened to the housing 124. A user may tighten the retainers 154A against the valve covers 152A to apply a predetermined preload on the valve covers 152A.

Alternatively, the removable valve covers 152A may be inserted into the housing bores 150 prior to assembling the plate 136 to the housing 124, and the retainers 154A may be partially threaded into the plate 136 prior to attaching the plate 136 to the housing 124; followed by final adjustments such that the retainers 154A abut the valve covers 152A once the plate 136 is fastened to the housing 124.

In operation, to remove the valve covers 152A, the retainers 154A are rotated relative to the plate bore 148 until fully unthreaded. At that time, the valve covers 152A can be accessed for removal or inspection. The plate 136 does not need to be removed to access or remove the valve covers 152A. In other embodiments, the plate 136 may prevent axial removal of the valve covers 152A, and need to be removed prior to removal of the valve covers 152A. In such embodiments, the plate is removed by unthreading the nuts 182 from the tie rods 180 and axially moving the plate 136 away from the surface 156 of the housing 124.

In some embodiments, the tie rods 180 may be used in combination with individual plates (each plate having one plate bore and associated with one retainer 154A, one housing bore 150), where multiple plates are fastened to the housing 124.

Figure 6:
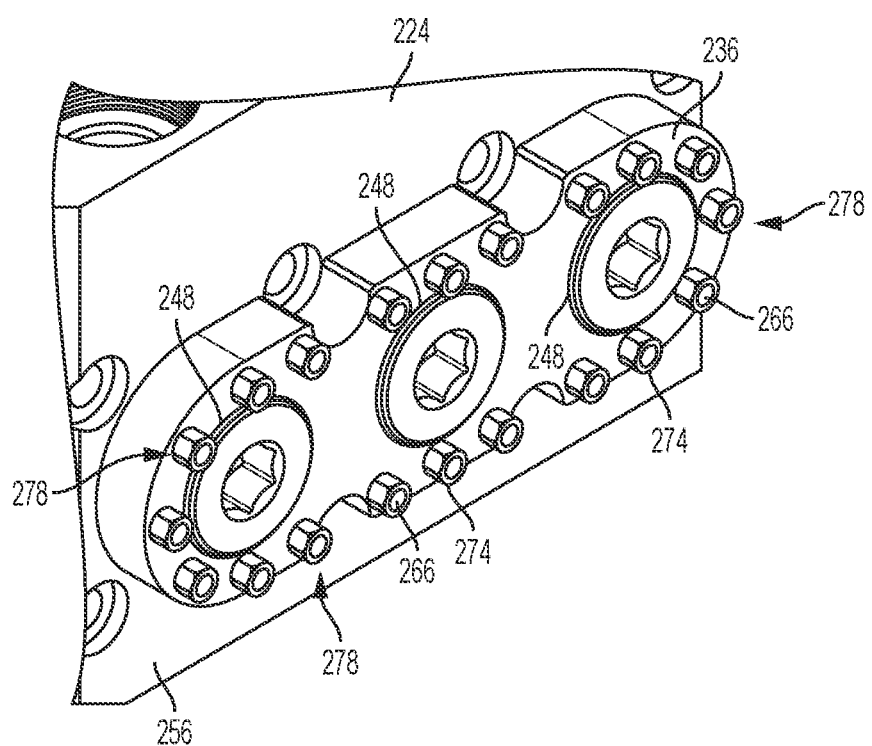
FIG. 6 is a perspective view of a retainer assembly of a hydraulic fluid pump according to another embodiment.
Figure 7:
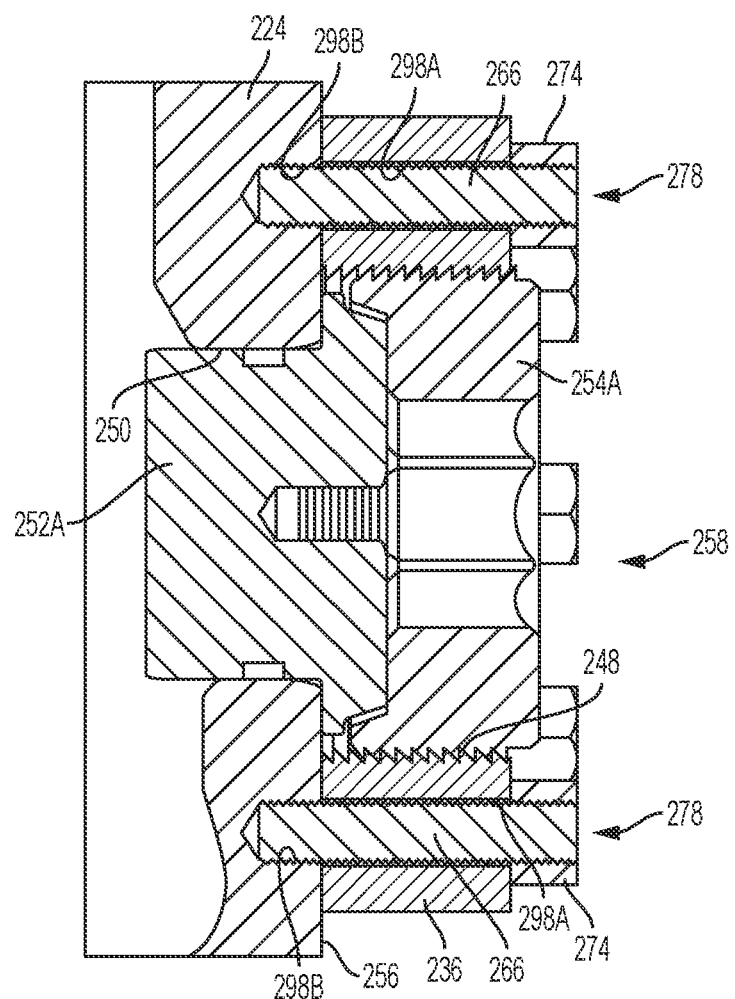
FIG. 7 is a sectional view of the retainer assembly of FIG. 6, shown through a retainer and a plurality of fasteners.

FIGS. 6-7 illustrate another embodiment of the invention. Like elements are indicated by like reference numerals incremented by 200 (relative to the components shown in FIGS. 1-2) and are similar to those elements except as otherwise described.

As shown in FIG. 6, the plate 236 is modified relative to the plate 136 shown in FIGS. 3-5. The plate 236 is contoured such that the tie rods (similar to tie rods 180) do not extend through the plate 236, but rather extend around the plate 236 such that the tie rods do not fasten the plate 236 to the housing 224. Rather, the plate 236 is fastened to the housing via other threaded fasteners 278. As shown, the threaded fasteners 278 include threaded studs 266 and nuts 274. In other embodiments, the threaded fasteners 278 may be embodied as, for example, bolts.

The studs 266 are threaded cylindrical posts having an axial length to extend through stud bores 298A in the plate 236 and into threaded stud bores 298B in the housing 224. As shown, the stud bores 298A are spaced apart around a periphery of the plate 236. While the stud bores 298B are threaded to engage the studs 266, the stud bores 298A in the plate may be unthreaded. Each stud 266 protrudes out from the plate 236 such that a nut 274 can be threaded onto a distal end each stud 266. The threads of the stud 266 permit linear translation of the nut 274 and the nut 274 axially translates along the stud 266 via the threads to abut the plate 236 and hold the plate relative to the housing 224. Alternatively, bolts may be used to fasten the plate 236 to the housing 224.

The plate 236 includes a plurality of plate bores 248 that are aligned with the housing bores 250 when the plate 236 is located adjacent the surface 256 of the housing 224. Similarly, the stud bores 298A of the plate 236 are aligned with the threaded stud bores 298B of the housing 224 when the plate bores 248 are aligned.

Similar to the embodiment shown above in FIGS. 3-5, because the plate 236 is a single plate having a plurality of plate bores 248, the plate bores 248 are accurately spaced relative to one another and can be quickly aligned with the housing bores 250 by aligning a first one of the plate bores 248 relative to a first housing bore 250. Further, utilizing a single plate helps to provide a more consistent preload across all valve covers 252A.

In operation, to assemble a plurality of valve covers 252A within a fluid end assembly 214 of a hydraulic fluid pump 210, some or all (i.e., at least two) of the studs 266 are threaded into the stud bores 298B of the housing 224, thereby securing a second end of the studs 266 to the housing 224. The operator aligns a first stud bore 298A of the plate 236 over a first stud 266 already positioned in the first stud bore 298B. A second stud bore 298A of the plate 236 is similarly aligned with a second stud 266 already positioned in the second stud bore 298B. With two of the stud bores 298A axially aligned with their respective stud bores 298B of the housing 224, any additional stud bores 298A are also aligned with their respective housing stud bores 298B. When the stud bores 298A, 298B are aligned, the plate bores 248 are likewise aligned with the housing bores 224. The plate 236 is fastened to the housing 224 of the fluid end assembly 212. Once aligned, the plate 236 is axially translated along the length of the studs 266 and into abutment with the surface 256 of the housing 224. In this way, the studs 266 function as guides for axially aligning and translating the plate 236 relative to the housing 224. Fastening the plate 236 to the housing 224 includes threading the nut 274 onto a first end of each stud 266 and applying a predetermined torque to each nut 274. The plate 236 is thereby sandwiched between the nuts 274 and the housing 224 to prevent movement of the plate 236 relative to the housing 224. The removable valve covers 252A are inserted into respective housing bores 250 within the housing 224 of the fluid end assembly 212. The retainers 254A are threaded into respective plate bores 248 and are tightened (by threading the retainers 254A within the respective threaded plate bores 248) against the removable valve covers 252A. A user may tighten the retainers 254A against the valve covers 252A to apply a predetermined preload on the valve covers 252A.

The retainers 254A may be inserted into the plate 236 after the plate 236 is fastened to the housing 224. Alternatively, the removable valve covers 252A may be inserted into the housing bores 250 prior to assembling the plate 236 to the housing 224, and the retainers 254A may be partially threaded into the plate 236 prior to attaching the plate 236 to the housing 224; followed by final adjustments such that the retainers 254A abut the valve covers 252A once the plate 236 is fastened to the housing 224. In some embodiments, bolts may be used in place of the studs 266 and the nuts 274.

In operation, to remove the valve covers 252A, the retainers 254A are rotated relative to the plate bore 248 until fully unthreaded. At that time, the valve covers 252A can be accessed for removal or inspection. In some embodiments, the plate 236 does not need to be removed to access or remove the valve covers 252A. In other embodiments, the plate 236 may prevent axial removal of the valve covers 252A, and need to be removed prior to removal of the valve covers 252A. In such embodiments, the plate is removed by unthreading the nuts 274 from the studs 266 and axially moving the plate 236 away from the surface 256 of the housing 224.

Figure 8:
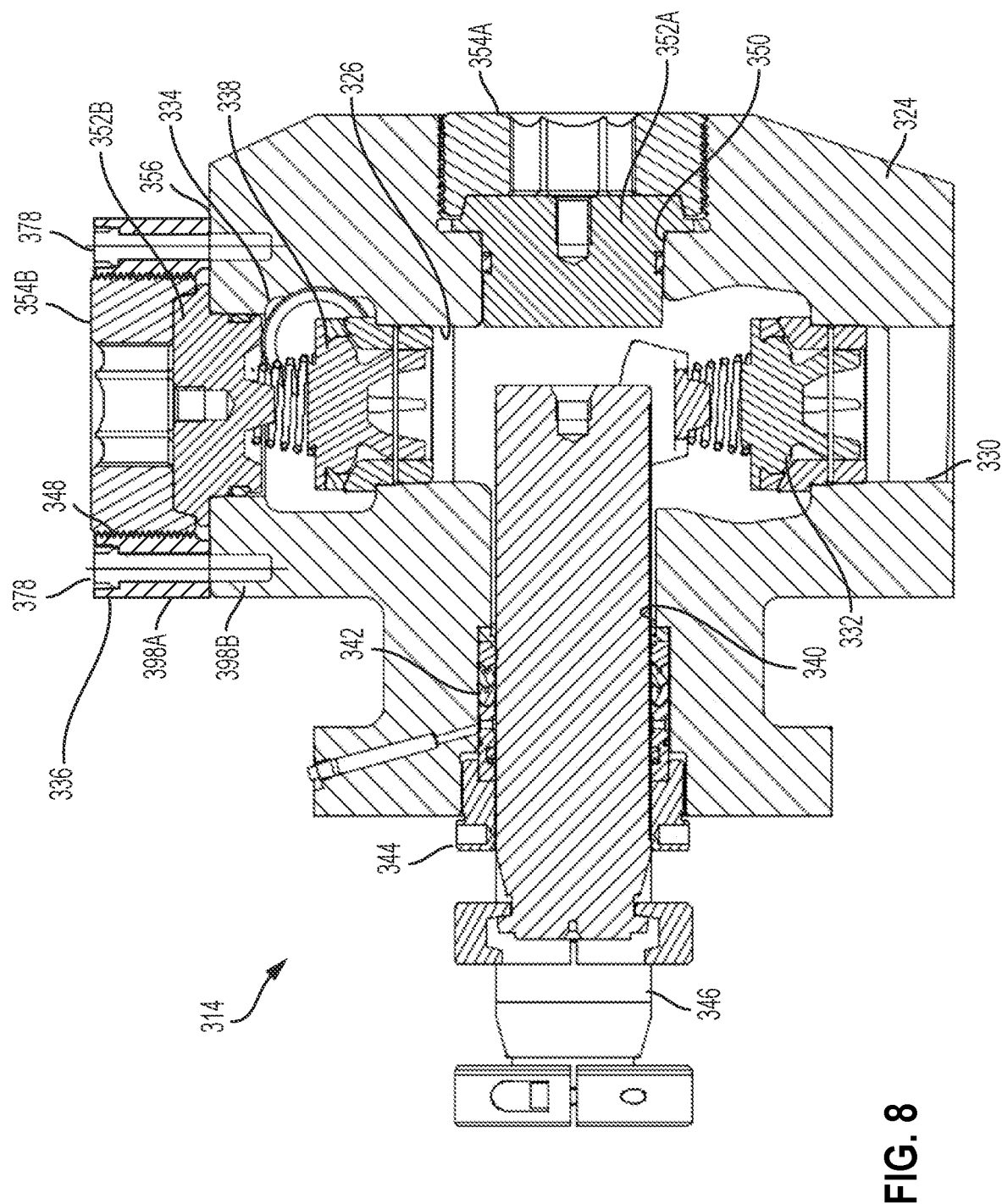
FIG. 8 is a cross-sectional view of a retainer assembly of a hydraulic fluid pump, according to another embodiment.

FIG. 8 illustrates another embodiment of the invention. Like elements are indicated by like reference numerals incremented by 300 (relative to the components shown in FIGS. 1-2) and are similar to those elements except as otherwise described.

As shown in FIG. 8, the plate 336 is similar to the plate 236 shown in FIGS. 6-7, though the location of the plate 336 is dissimilar, as the plate 336 is positioned at the outlet bore 334 rather than the service bore 350. Therefore, the plate 336 is positioned over the valve cover 352B rather than the valve cover 352A of the service bore 350.

The plate 336 is fastened to the housing via threaded fasteners 378. As shown, the threaded fasteners 378 are embodied as bolts. In other embodiments, the threaded fasteners 378 may include, for example, threaded studs and nuts. The fasteners 378 are threaded cylindrical posts having a head and an axial length to extend through stud bores 398A in the plate 336 and into threaded stud bores 398B in the housing 324. Similar to the embodiments shown in FIGS. 3 and 6, the stud bores 398A are spaced apart around a periphery of the plate 336. While the stud bores 398B are threaded to engage the studs 378, the stud bores 398A in the plate may be unthreaded.

The plate 336 includes a plurality of plate bores 348 (extending into the page, as shown in FIG. 8) that are aligned with the housing bores 334 when the plate 336 is located adjacent the surface 356 of the housing 324. Similarly, the stud bores 398A of the plate 336 are aligned with the threaded stud bores 398B of the housing 324 when the plate bores 348 are aligned. Because the plate 336 is a single plate having a plurality of plate bores 348, the plate bores 348 are accurately spaced relative to one another and can be quickly aligned with the housing bores 334 by aligning a first one of the plate bores 348 relative to a first housing bore 334. Further, utilizing a single plate helps to provide a more consistent preload across all valve covers 352B.

In operation, to assemble a plurality of valve covers 352B within a fluid end assembly 314 of a hydraulic fluid pump, the valve 338 and valve cover 352B are positioned within the housing bore 324. If the fasteners 378 are studs or other fasteners capable of extending fully through the stud bores 398B in the plate 336, some or all (i.e., at least two) of the fasteners 378 are threaded into the stud bores 398B of the housing 324, such that the plate 336 can be aligned to the housing by extending over the fasteners 378, as described with respect to FIGS. 3-7 above. If the fasteners 378 are bolts that extend through the plate 336 and terminate within the housing 324, the plate 336 is otherwise aligned with the openings prior to insertion of the fasteners 378. Fastening the plate 336 to the housing 324 includes threading a nut onto the fastener 378 or tightening the fastener 378 against the plate 336. The plate 336 is thereby sandwiched against the housing 324 to prevent movement of the plate 336 relative to the housing 324. The removable valve covers 352B are inserted into respective housing bores 334 within the housing 324 of the fluid end assembly. The retainers 354B are threaded into respective plate bores 348 and are tightened (by threading the retainers 354B within the respective threaded plate bores 348) against the removable valve covers 352B. A user may tighten the retainers 354B against the valve covers 352B to apply a predetermined preload on the valve covers 352B.

The retainers 354B may be inserted into the plate 336 after the plate 336 is fastened to the housing 324. Alternatively, the removable valve covers 352B may be inserted into the housing bores 334 prior to assembling the plate 336 to the housing 324, and the retainers 354B may be partially threaded into the plate 336 prior to attaching the plate 336 to the housing 324; followed by final adjustments such that the retainers 354B abut the valve covers 352B once the plate 336 is fastened to the housing 324.

In operation, to remove the valve covers 352B, the retainers 354B are rotated relative to the plate bore 348 until fully unthreaded. At that time, the valve covers 352B can be accessed for removal or inspection. In some embodiments, the plate 336 does not need to be removed to access or remove the valve covers 352B. In other embodiments, the plate 336 may prevent axial removal of the valve covers 352B, and need to be removed prior to removal of the valve covers 352B. In such embodiments, the plate is removed by unthreading the fasteners 378 and moving the plate 336 away from the surface 356 of the housing 324.

Various features and advantages of the invention are set forth in the following claims.

What is claimed is:

1. A method of assembling a first removable valve cover and a second removable valve cover within a fluid end assembly of a hydraulic fluid pump, the method comprising:
   inserting the first removable valve cover into a first housing bore of a housing of the fluid end assembly;
   inserting the second removable valve cover into a second housing bore of the housing of the fluid end assembly;
   axially aligning a first plate bore of a plate with the first housing bore;
   axially aligning the second plate bore of the plate with the second housing bore;
   fastening the plate to the housing of the fluid end assembly;
   positioning a first retainer into the first plate bore and into abutment with the first removable valve cover; and
   positioning a second retainer into the second plate bore and into abutment with the second removable valve cover.

2. The method of claim 1, wherein fastening the plate to the housing includes abutting the plate against a surface of the housing, wherein inserting the first removable valve cover into the first housing bore includes abutting a circumferential lip of the first removable valve cover against the surface of the housing, and wherein inserting the second removable valve cover into the second housing bore includes abutting a circumferential lip of the second removable valve cover against the surface of the housing.

3. The method of claim 1, wherein fastening the plate to the housing of the fluid end assembly includes extending a plurality of fasteners through the plate and into the housing.

4. The method of claim 1, wherein fastening the plate to the housing of the fluid end assembly includes extending a plurality of fasteners through the plate, into a first axial end of the housing, and through a second axial end of the housing, opposite the first axial end.

5. The method of claim 1, wherein positioning the first retainer into the first plate bore includes threading the first retainer into the first plate bore, and wherein positioning the second retainer into the second plate bore includes threading the second retainer into the second plate bore.

6. The method of claim 1, wherein fastening the plate to the housing includes inserting a rod through the plate and into the housing, and threading a nut onto the rod and into axial abutment with the plate.

7. The method of claim 1, wherein the first removable valve cover is disposed between the first retainer and the first housing bore, and wherein the second removable valve cover is disposed between the second retainer and the second housing bore.

8. A method of assembling a removable valve cover within a fluid end assembly of a hydraulic fluid pump, the method comprising:
  inserting the removable valve cover into a housing bore of a housing of the fluid end assembly;
  axially aligning a plate bore of a plate with the housing bore;
  fastening the plate to the housing of the fluid end assembly; and
  positioning a retainer into the plate bore and into abutment with the removable valve cover.

9. The method of claim 8, wherein fastening the plate to the housing includes abutting the plate against a surface of the housing, and wherein inserting the removable valve cover into the housing bore includes abutting a circumferential lip of the removable valve cover against the surface of the housing.

10. The method of claim 8, wherein fastening the plate to the housing of the fluid end assembly includes extending a plurality of fasteners through the plate and into the housing.

11. The method of claim 8, wherein fastening the plate to the housing of the fluid end assembly includes extending a plurality of fasteners through the plate, into a first axial end of the housing, and through a second axial end of the housing, opposite the first axial end.

12. The method of claim 8, wherein positioning the retainer into the plate bore includes threading the retainer into the plate bore.

13. The method of claim 8, wherein fastening the plate to the housing includes inserting a rod through the plate and into the housing, and threading a nut onto the rod and into axial abutment with the plate.

14. The method of claim 8, wherein the removable valve cover is disposed between the retainer and the housing bore.

15. A method of assembling a removable valve cover within a fluid end assembly of a hydraulic fluid pump, the method comprising:
  axially aligning a plate bore of a plate with a housing bore of a housing of the fluid end assembly;
  fastening the plate to the housing of the fluid end assembly;
  inserting the removable valve cover through the plate bore and into the housing bore; and
  positioning a retainer into the plate bore and into abutment with the removable valve cover.

16. The method of claim 15, wherein fastening the plate to the housing includes abutting the plate against a surface of the housing, and wherein inserting the removable valve cover into the housing bore includes abutting a circumferential lip of the removable valve cover against the surface of the housing.

17. The method of claim 15, wherein fastening the plate to the housing of the fluid end assembly includes extending a plurality of fasteners through the plate and into the housing.

18. The method of claim 15, wherein fastening the plate to the housing of the fluid end assembly includes extending a plurality of fasteners through the plate, into a first axial end of the housing, and through a second axial end of the housing, opposite the first axial end.

19. The method of claim 15, wherein positioning the retainer into the plate bore includes threading the retainer into the plate bore.

20. The method of claim 15, wherein fastening the plate to the housing includes inserting a rod through the plate and into the housing, and threading a nut onto the rod and into axial abutment with the plate.

* * * * *